Figure 1:
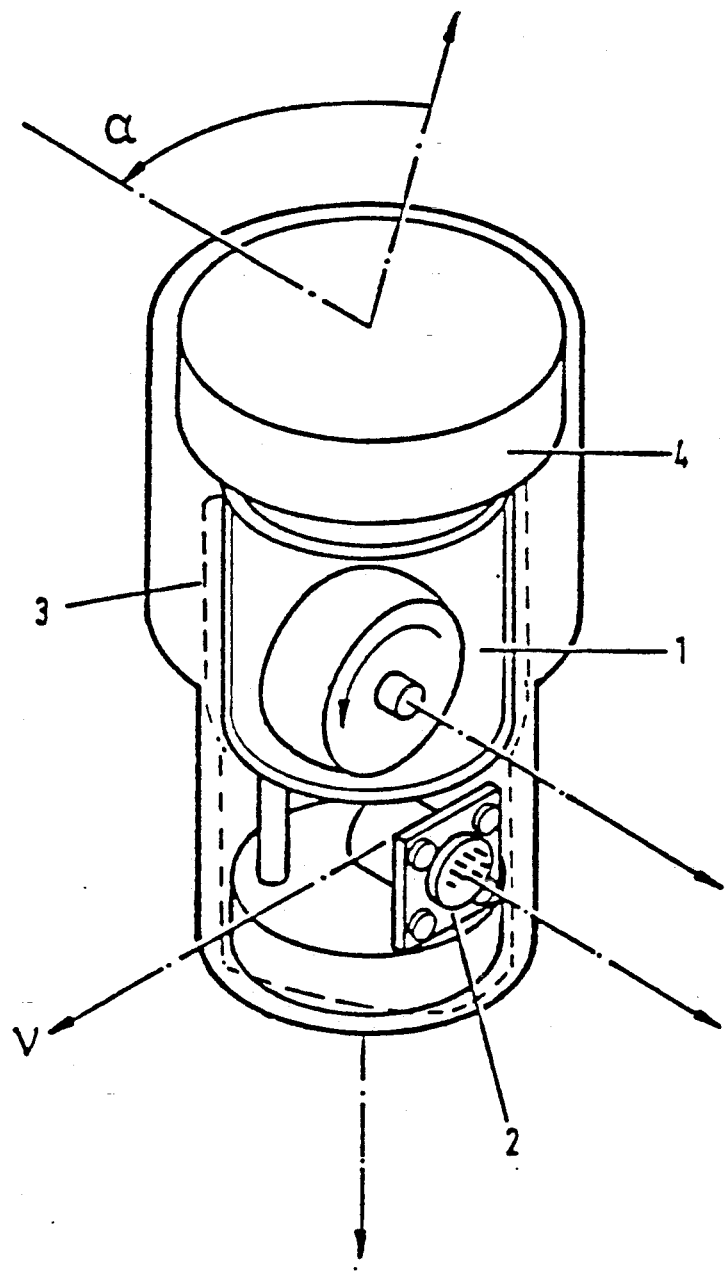

United States Patent [19]
Sindlinger et al.

[11] Patent Number: 5,117,559
[45] Date of Patent: Jun. 2, 1992

[54] METHOD OF IMPROVING THE NORTH SEEKING RESULT

[75] Inventors: Rainer Sindlinger, Hirschberg; Bernhard Woll, Bad Schönborn, both of Fed. Rep. of Germany

[73] Assignee: Teldix GmbH, Heidelberg, Fed. Rep. of Germany

[21] Appl. No.: 654,622

[22] PCT Filed: Jul. 7, 1989

[86] PCT No.: PCT/EP89/00778
§ 371 Date: Feb. 20, 1991
§ 102(e) Date: Feb. 20, 1991

[87] PCT Pub. No.: WO90/02311
PCT Pub. Date: Mar. 8, 1990

[30] Foreign Application Priority Data
Aug. 20, 1988 [DE] Fed. Rep. of Germany ....... 3828410

[51] Int. Cl.⁵ ............................................. G01C 19/38
[52] U.S. Cl. ........................................................ 33/324
[58] Field of Search ................................... 33/324, 326

[56] References Cited
FOREIGN PATENT DOCUMENTS

| | | |
|---|---|---|
| 2223625 | 11/1972 | Fed. Rep. of Germany . |
| 2545026 | 4/1977 | Fed. Rep. of Germany . |
| 3131111 | 2/1983 | Fed. Rep. of Germany . |
| 3141405 | 5/1983 | Fed. Rep. of Germany . |
| 3240804 | 5/1984 | Fed. Rep. of Germany . |
| 3346450 | 7/1985 | Fed. Rep. of Germany . |
| 3422738 | 12/1985 | Fed. Rep. of Germany . |

Primary Examiner—Harry N. Haroian
Attorney, Agent, or Firm—Spencer, Frank & Schneider

[57] ABSTRACT

In a process for filtering the consecutive results yi of a north-seeking gyroscope which are ooverridden by interference signals, the difference between the extreme measured values within a time window is determined. Only if this difference is less than a given maximum deviation y is the means value of the measurements in this time window given as the corrected direction of north.

18 Claims, 5 Drawing Sheets

METHOD OF IMPROVING THE NORTH SEEKING RESULT

PROBLEM AND PRIOR ART

North-seeking or north-determining gyros (NSG) usually serve to determine the direction of mobile equipment (vehicles, directional antennas, tunnel heading and cutting machines, geodetic instruments, etc.) and are subject to more or less heavy interference movements during the north-seeking process even if the vehicle is not moving. Methods are known (for example, from DE-OS [German Laid-Open Patent Application]3,346,450) to reduce the sensitivity to rotary interfering movements, for example with the aid of a further sensor. In real system applications, the interfering movements lie within a very broad frequency range and their amplitude often exceeds the useful signal by many orders of magnitude; however, at the same time, high measuring accuracy is required during a short measuring period (e.g., only 1 to 2 minutes)

Prior art filtering methods do not always furnish sufficiently accurate results. The measuring accuracy becomes poorer, in particular, for greater interfering movements and with increasing geographic latitude since then the usable earth rotation component decreases.

Depending on the interfering movement, a more or less noise encumbered north-seeking result is available at the output of the north-seeking gyro. The noise amplitude increases with increasing geographic latitude. The noise process is generally not stationary, that is the noise amplitude changes over time; noisy phases alternate with quieter sections, low-frequency sections alternate with higher frequency sections.

ADVANTAGES OF THE INVENTION

This signal is now subjected to digital filtering including the features of claim 1. This filter, called a "window algorithm" selects particularly the quieter phases and filters out accurate measuring results as a function of filter criteria.

The filtering method according to claim 1 can be improved further by pre-filtering methods according to claims 2 and 3. Further modifications result from the further dependent claims. The procedure results in a number of advantages, namely:

- a very effective filtering out of the influences of interfering movements;
- the staggering of time windows of different widths and heights permits adaptation to a very broad noise spectrum;
- very easy adaptation to a specified accuracy is possible by predetermining the filter criteria (N; $\Delta\gamma$);
- in contrast to the duration of the north-seeking process, the resulting accuracy is independent of noise spectrum and geographic latitude;
- it is possible to predetermine a maximum time for the north-seeking process;
- it is possible to terminate the north-seeking process if the filter criteria are not met at the end of the permissible time Tmax;
- low computer expenditures;
- low memory requirement in the computer;
- upon termination, the filtering method can also be employed to determine a result with less accuracy;

in this process, an identification can be specified and put out which provides information with respect to the accuracy.

DESCRIPTION OF THE DRAWING FIGURES

Embodiments of the invention will be described with reference to the drawing figures.

Figure 2:
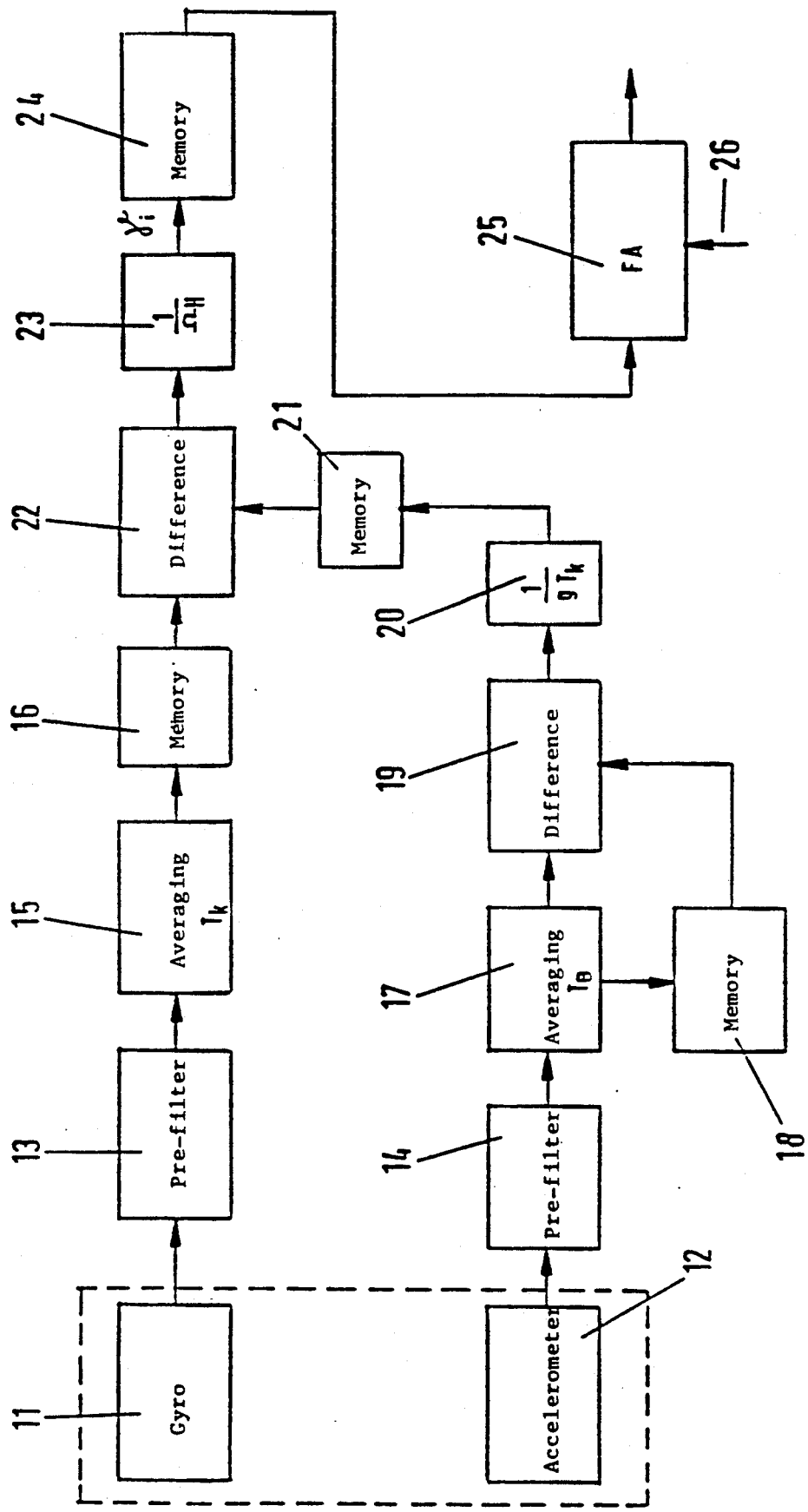
Figure 4:
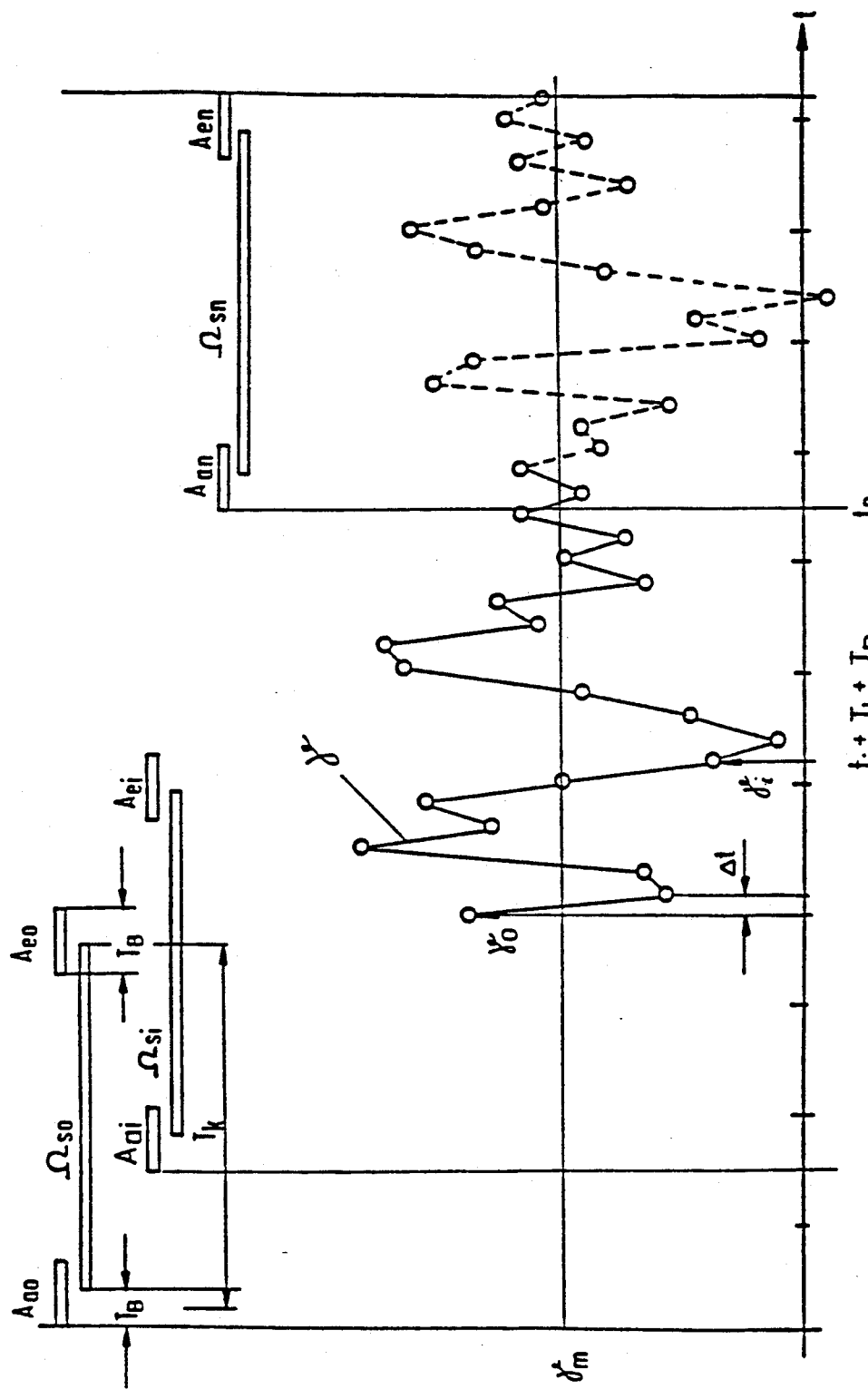
Figure 5:
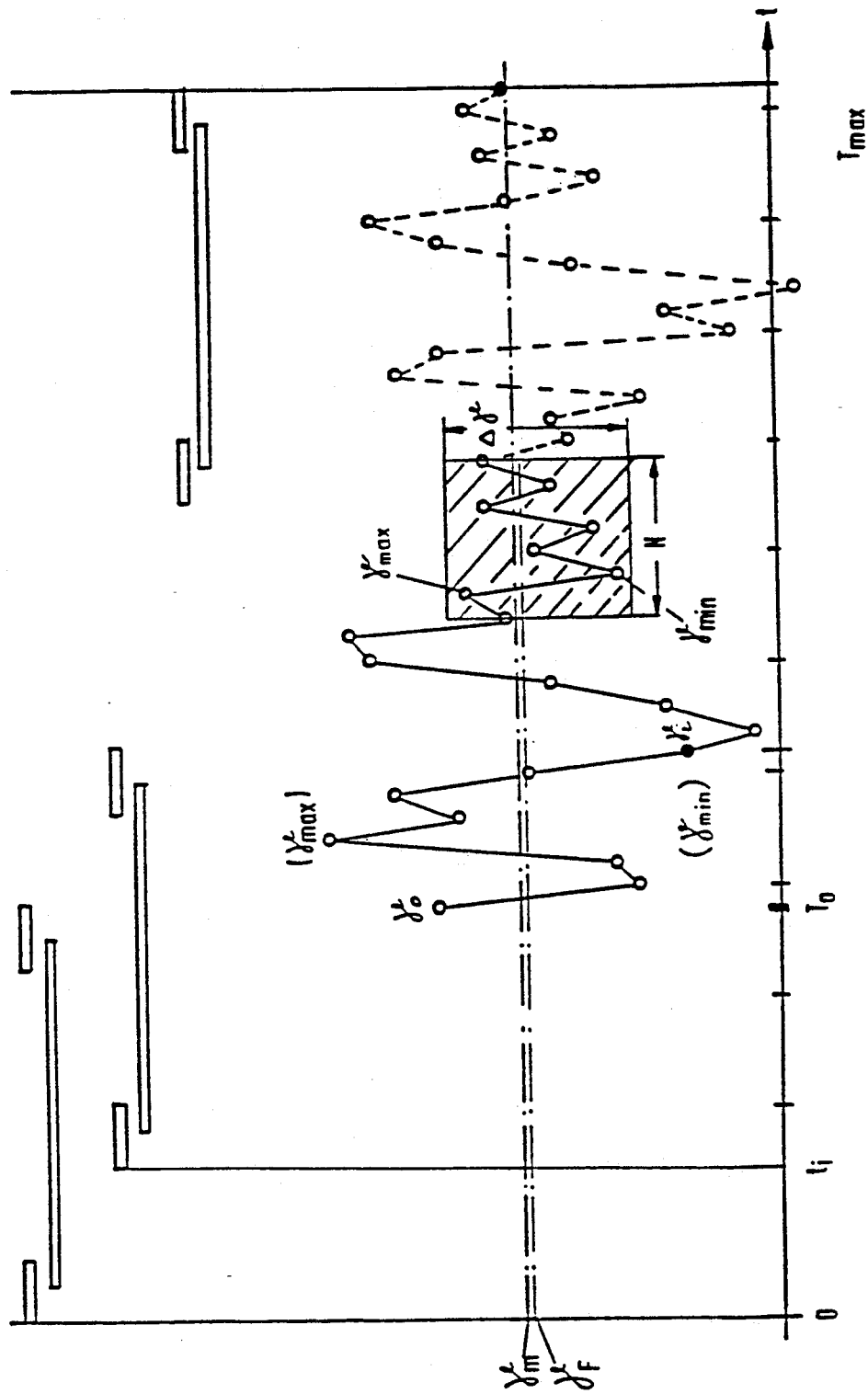

It is shown in:

FIG. 1, the configuration of a north-seeking gyro;

FIG. 2, a block circuit diagram of the filter arrangement;

FIG. 3, diagrams;

FIG. 4, diagrams to explain the error compensation by means of the accelerometer signal;

FIG. 5, diagrams to explain the main filtering by means of the time window.

FIG. 1 shows the configuration of the gyro: a gas bearing rate gyro 1 is installed together with an accelerometer 2 in a frame 3 rotatable about the elevation axis. The elevated frame 3 can be rotated about an angle $\alpha$ by means of a servomotor 4, e.g. a stepping motor, so that the measuring axes of the gyro and of the accelerometer can be pivoted into discrete directions.

The arrangement is described in greater detail in DE-OS 3,346,450.

FIG. 2 is a block circuit diagram of the filter. The reference numeral 11 identifies a north-determining gyro (a gyro that can be rotated into several positions) including an evaluation circuit. Block 11 is intended to put out measurement signals (angular velocities) at given time intervals T. The reference numeral 12 identifies an accelerometer which also puts out measurement signals at time intervals T. Both signals are fed to filters 13 and 14 which filter out higher frequency noise components. The average of the pre-filtered gyro measurement values is formed in a block 15 over a time period $T_K$ and this average is stored in a memory 16. At the beginning and end of period $T_K$, the averages $A_a$ and $A_e$ of the accelerometer output signal are formed in a block 17 at intervals $T_B$ and the difference $(A_e - A_a)$ is formed by means of a memory 18 and a difference former 19.

After division by the gravitational acceleration g and the measuring interval $T_K$ in a block 20, the rate of tilt change determined by accelerometer 12 during the time $T_K$ is obtained as follows:

$$\Delta\dot{v} = \frac{v_e - v_a}{T_K} = (A_e - A_a)/gT_K$$

This result is stored in a memory 21. In a difference former 22, the difference is formed between the average $\Omega$ of the gyro signal stored in memory 16 and the rate of tilt change $\Delta\dot{v}$ stored in memory 21. The signal corrected by $\Delta\dot{v}$ is then divided in a block 23 by the horizontal component $\Omega_H = \omega_E \cos\phi$ of the earth rotation vector. The result is the north-seeking result $\gamma i$ at time i, which is fed into a memory 24. This and adjacent north-seeking results are then filtered once more in a main filter 25 equipped with a time window. The filter criteria (number of north-seeking results $\gamma i$ and maximum deviations $\Delta\gamma$ included in the time window) can be varied by way of an input 26.

Figure 3A:
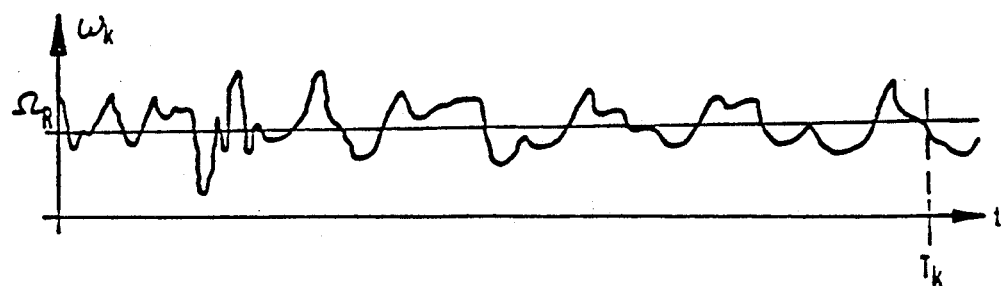
Figure 3B:
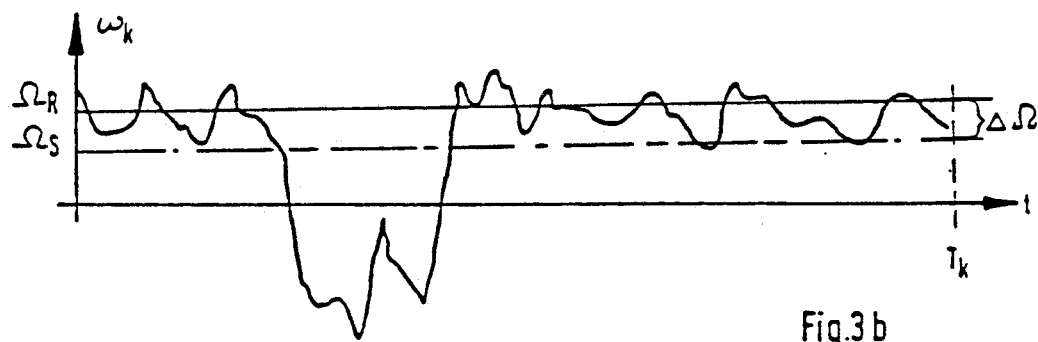

FIG. 3 shows the output signals of the gyro and of the accelerometer. FIG. 3 shows a gyro signal including only little noise; its average over the time period $T_K$ is $\Omega_R$ (average at rest). FIG. 3b shows a gyro signal in which a greater interfering movement occurs in its middle section. This results in an average $\Omega_S$ and an average offset $\Delta\Omega$. This offset results in a north-determination error $\delta\gamma$ as follows:

$$\delta\gamma = \Delta\omega/\omega H$$

Figure 3C:
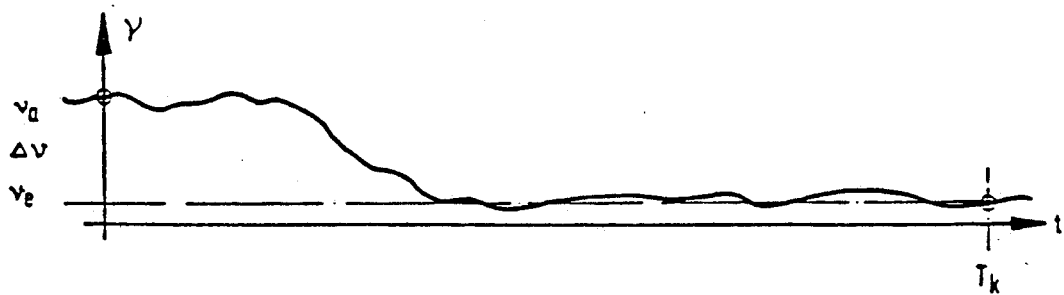

The accelerometer simultaneously senses a change in tilt $$\Delta\nu = \nu_e - \nu_a$$

about the gyro measuring axis, where
$\nu_a = A_a/g$ and $\nu_e = A_e/g$ (see FIG. 3c).

The noise angle velocity is calculated from the change in tilt as $$\Delta\Omega_S = \Delta\nu/T_K$$

where
$\Omega_R$ = the average over time of the non-interfered-with gyro signal over the time period $T_K$;
$\Omega_S$ = the average over time of the interfered-with gyro signal over the time period $T_K$;
$\omega_E$ = the angular velocity of the earth's rotation;
$\phi$ = the geographic latitude;
$\nu_a$ = the tilt angle at the beginning of measuring interval $T_K$;
$\nu_e$ = the tilt angle at the end of measuring interval $T_K$;
$A_a$ = the average of the accelerometer signal over a time period $T_B$ at the beginning of measuring interval $T_K$;
$A_e$ = the average of the accelerometer signal over a time period $T_B$ at the end of measuring interval $T_K$;
$g$ = the gravitational acceleration.

FIG. 4 is a schematic representation of the filter (15–22) which utilizes the accelerometer signal: the measurement begins at time $t_0 = 0$ with the formation of an average of the accelerometer signal over a time period $T_B$ (17). The result $A_{a0}$ is stored (18). At time $T_B/2$, averaging of the gyro signal begins over a time period $T_K$ (15). The result $\Omega_{S0}$ is stored (16). At time $t = T_K$, averaging of the acceleration signal begins, again over a time period $T_B$ (17). The result $A_{e0}$ is also stored. On the basis of the above formulas, the north-seeking result $\gamma_0$, which has been corrected with respect to the interfering rotational movements, is now calculated (19–23) from the stored averages.

The described sequence is repeated at discrete time intervals $\Delta t$ (e.g., 1 second). Thus, the north-seeking process started, for example, at time $t_i$, that is, the sequence offset in time by $t_i$, furnishes the north-seeking result $\gamma_i$. All intermediate results $\gamma_i$ are stored. This results in the curve for the intermediate north-seeking result $\gamma$ which is shown in the lower portion of FIG. 4 (and still contains a lot of noise). Its average (averaged over a long period of time) is the desired north-seeking result $\gamma_m$.

FIG. 5 shows the main filtering of the intermediate north-seeking result with the aid of a time window: here, beginning at time $T_0 = t_0 + T_B + T_K$, the minimum values $\gamma$min and the maximum values $\gamma$max are each determined from a number N of intermediate results. Then a check is made whether the difference is $$\gamma\text{max} - \gamma\text{min} < \Delta\gamma$$

where $\Delta\gamma$, the permissible maximum deviation ("window height"), and N, the number of measurements under consideration ("window width"), are the two filter criteria. If this condition is not met, the process is offset in time by $\Delta t$, that is, it is repeated beginning at time $T_0 + \Delta t$ until either (a) the above filter criterion has been met; or
(b) the maximum permissible measuring duration Tmax has expired.

In case (a), the north-seeking result is now obtained by forming an average from the N intermediate results for which the criterion has been met.

In case (b), the north-seeking process is terminated.

Once the measurement values are stored, a new passage with reduced filter criteria can be started at the end of Tmax and this can be repeated until a result is available. In this case, the result is advisably identified with respect to the filter criteria employed so as to obtain information about its (reduced) accuracy.

The drawing figures served to describe the case where one time window is employed. However, it is also possible to employ several time windows simultaneously with different filter criteria and to form the north-seeking result from the average of that window for which the filter criterion was met first. The number of north-seeking results N and the maximum deviations $\Delta\gamma$ can be selected in such a manner that the same accuracies result in spite of different criteria.

It is possible to have the user determine the criteria individually, or groups of criteria N, $\Delta\gamma$ which each furnish the same accuracy can be stored in a memory and the user can select the group representing the desired accuracy. However, it is also possible to predetermine windows which, with increasing measuring duration, permit greater errors. It is favorable if the various window widths are selected in such a way that N is of a ratio of $1:2:\ldots:2^{(n-1)}$.

We claim:

1. A method of improving the north-seeking result determined by means of a north-seeking gyro, wherein the determined north-seeking results $\gamma_i$ are put out at given time intervals and an average is formed from a plurality (N) of successive north-seeking results lying within a time window, characterized in that initially the maximum north-seeking result $\gamma$max and the minimum north-seeking result $\gamma$min within the time window are determined and the average $\gamma_m$ is put out as the north-seeking result to be employed only if the difference $\gamma\text{max} - \gamma\text{min} < \Delta\gamma$, where $\Delta\gamma$ constitutes a given maximum deviation (filter criteria).

2. A method according to claim 1, characterized in that the higher frequency noise components are filtered out of the north-seeking results put out by the north-seeking gyro.

3. A method according to claim 1, characterized in that an accelerometer is also accommodated in a frame that is rotatable about the elevation axis and in which the north-seeking gyro is mounted, and the following method steps are employed to filter out low frequency noise components:

the put-out gyro measurement values are averaged over a given time period $T_K$;
the change $\Delta\nu$ of the tilt angle is determined over the time period $T_K$;
the velocity of the change $\Delta\dot{\nu}$ of tilt is determined by dividing it by the period duration $T_K$;
the difference is formed between the gyro average and the rate of tilt angle change;

the resulting difference is divided by the horizontal component $\Omega_H$ of the earth's rotation and is processed further each time as the put-out north-seeking result.

4. A method according to claim 1, characterized in that the number (N) of the north-seeking results lying within the time window is adjustable.

5. A method according to claim 1, characterized in that the maximum deviation $\Delta\gamma$ is adjustable.

6. A method according to claim 1, characterized in that a plurality of time windows including a different number of north-seeking results (N) and a different maximum deviation $\Delta\gamma$ are employed simultaneously and the north-seeking result is formed from the average of that window for which the respective filter criterion is met first.

7. A method according to claim 6, characterized in that the number of north-seeking results N and the maximum deviations $\Delta\gamma$ are selected in such a way that they furnish approximately the same accuracy.

8. A method according to claim 6, characterized in that the filter criteria are put in individually by the user.

9. A method according to claim 6, characterized in that the user is able to call up the filter criteria in groups from a memory, with each individual group being a measure of the desired accuracy.

10. A method according to claim 6, characterized in that, with an increasing number of north-seeking results (N), the maximum deviations $\Delta\gamma$ are selected in such a manner that with increasing measuring duration, a greater measuring error is permissible.

11. A method according to claim 6, characterized in that the number of north seeking results (N) is of a ratio as $1:2:\ldots:2^{(n-1)}$.

12. A method according to claim 1, characterized in that, upon a determination of $\gamma\max - \gamma\min > \Delta\gamma$, a new determination of the north-seeking result is initiated.

13. A method according to claim 12, characterized in that the north-seeking process is terminated after a maximum time period Tmax without a usable north-seeking result.

14. A method according to claim 13, characterized in that, if all determined north-seeking results $\gamma i$ are stored, the results $\gamma i$ are filtered again after the north-seeking process has been terminated and are possibly filtered repeatedly with step-wise increasing maximum deviation $\Delta\gamma$; and that average north-seeking result $\gamma_m$ is put out whose individual results met the existing filter criterion first.

15. A method according to claim 14, characterized in that the put-out result is identified with respect to the step at which it met the filter criteria.

16. A method according to claim 3, characterized in that the rate of change $\Delta v$ of the tilt angle $\Delta v$ {sic} is obtained from the difference between the acceleration signals at the beginning and end of the period $T_K$ and multiplication with $\overline{9 \cdot Tk}$ 17. A method according to claim 16, characterized in that the accelerometer signals are averaged for shorter periods of time $T_B$ at the beginning and end of the period $T_K$.

18. A method according to claim 3, characterized in that the filter parameters N, $\Delta\gamma$ and Tmax are permanently stored as instrument constants.

* * * * *